Patented Apr. 10, 1934

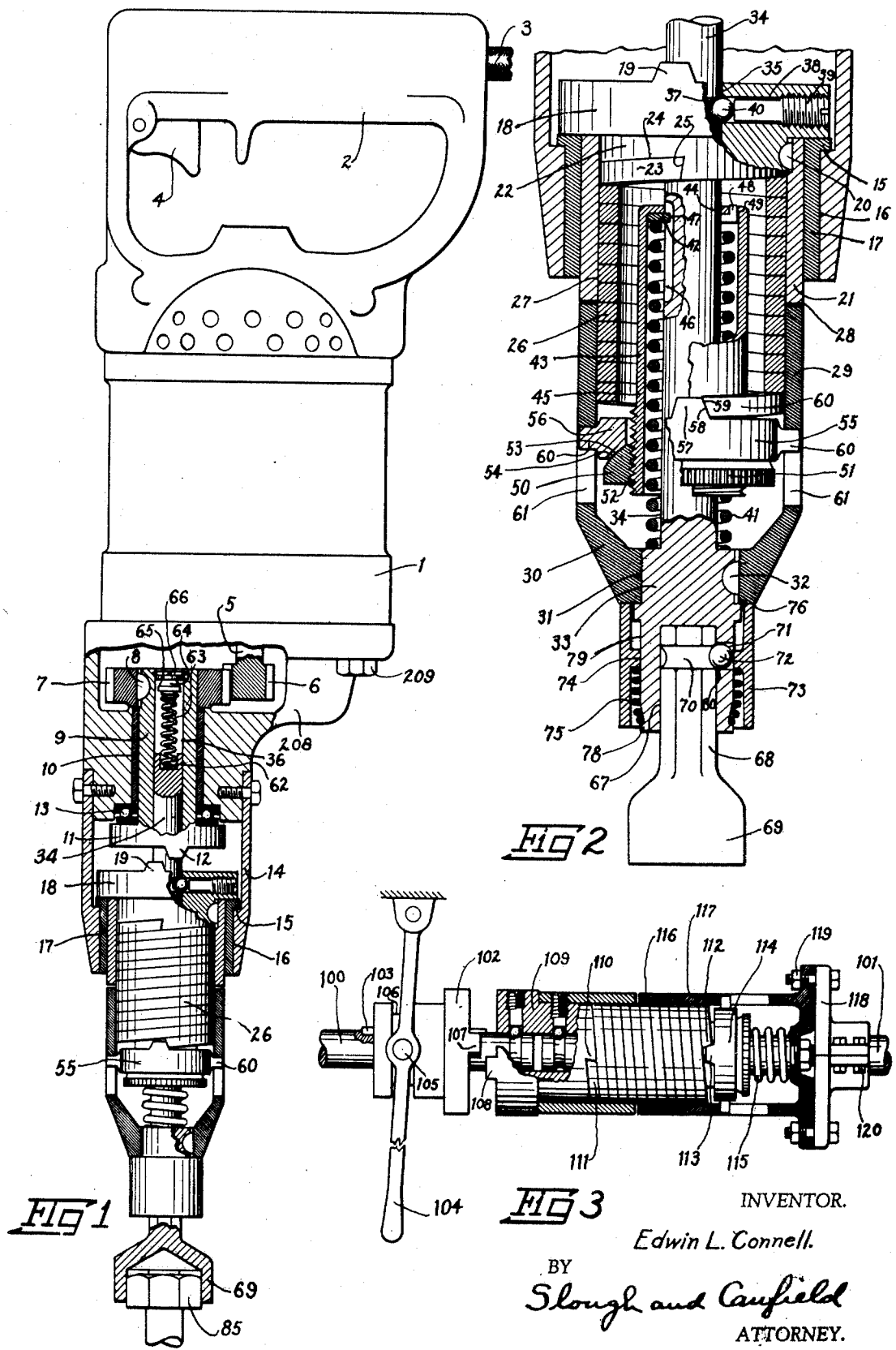

1,954,620

UNITED STATES PATENT OFFICE 1,954,620

CLUTCH

Edwin L. Connell, East Cleveland, Ohio

Application April 25, 1932, Serial No. 607,355

23 Claims. (Cl. 192—56)

This invention relates to clutches and particularly to self-releasing clutches adapted to release upon the occurrence of excessive transmitted load.

It is an object of my invention to provide an improved clutch for transmitting power from a driving to a driven machine element.

Another object is to provide a clutch having improved releasing mechanism whereby when the load transmitted by the clutch from a driving to a driven machine element exceeds a predetermined value the clutch will automatically be released, to break the driving connection from the driven element.

Another object is to provide such a clutch having improved adjusting means for adjusting the predetermined value at which the clutch automatically releases.

Another object is to provide in a device such as a clutch having mutually engageable clutching elements, improved structural means for effecting a clutching engagement between the elements.

Another object is to provide in a clutch comprising mutually engaged clutch elements adapted to transmit relatively great load, means whereby a resiliently yieldable element exerting relatively small force may maintain the clutch elements in engagement.

Another object is to provide a self-releasing clutch mechanism in which a relatively small force exerted by a yieldable clutch actuating element may maintain the clutch elements in relative engagements to transmit relatively great loads.

Another object is to provide a power transmitting clutch in which the engaged clutch elements comprise an expanding helical spring engaging the inner wall of a tubular element.

Another object is to provide a clutch having the characteristics set forth hereinbefore whereby rotary power may be transmitted from a rotary driving to a rotary driven element.

Another object is to provide a self-releasing rotary clutch having improved releasing means whereby upon release, at the attainment of a load above a predetermined value, the clutch releasing elements are protected against undue wear.

Another object is to provide a self-releasing clutch of the rotary power transmitting type adapted automatically to be moved into clutch engaged condition by an axial thrust upon the mechanism.

Another object is to provide a clutch mechanism of the characteristics set forth hereinbefore which will have greater durability and longer life in service than self-releasing clutches heretofore proposed.

Another object is to provide a clutch of the class referred to which will be positive in action both upon the engagement of the clutch elements and upon disengagement thereof.

Another object is to provide an improved clutch of the rotary power transmitting type which will be fully automatic in its action to engage clutch elements upon an axial thrust thereon and to disengage the same upon the attainment of a load above a predetermined value.

Other objects will be apparent to those skilled in the art to which my invention appertains.

My invention is fully disclosed in the following description taken in connection with the accompanying drawing in which Fig. 1 is a view illustrating the application of an embodiment of my invention to a motor driven hand operated nut driving tool;

Fig. 2 is a view similar to part of Fig. 1 drawn to larger scale and with additional parts in cross section;

Fig. 3 is a view illustrating a modified embodiment of my invention.

Referring to the drawing, I have shown generally at 1, the external housing of a motor, the housing terminating in a pistol grip handle 2, to which an electric current supplying cord 3 is secured and adjacent to which a trigger type switch 4 is disposed whereby upon gripping the handle 2, an operator may with his finger actuate the trigger 4 to close a circuit from the wires 3 to start a motor in the housing 1.

A motor shaft 5 generally vertically disposed as viewed in the drawing has thereon a pinion 6 meshed with a gear 7. The pinion 6 is supported on the shaft in the housing 1. The gear 7 meshed therewith and the parts now to be described are supported by a housing 208 secured to the lower end of the motor housing as by bolts 209.

The gear 7 is keyed as at 8 to a tubular shaft 9 rotatable in a bushing 10 press-fitted into a bore in the housing 208 and the tubular shaft 9 has on the lower end thereof, a primary clutch head 11 provided with one or more clutch teeth 12 and the head has end thrust bearing upon the housing through an end thrust ball bearing shown generally at 13.

The housing 208 has a tubular extension 14 provided with an internal annular shoulder 15 and a co-axial bore 16 within which bore is press-fitted a bearing bushing 17.

A lower primary clutch head 18 has a clutch tooth 19 engageable with the tooth 12 by upward axial movement thereof in a manner to be described, but as illustrated in Fig. 1 being axially spaced from the tooth 12 and therefore not engageable therewith. The clutch head 18 normally rests upon the upper end of the bushing 17 and has keyed thereto as at 20 an upper sleeve 21 rotatable in the bushing 17. The clutch head 18 has a cylindrical extension 22 fitted in the sleeve 21 and extending downwardly thereinto a suitable distance whereby it may engage the key 20.

The lower face of the extension 22 is shaped to conform to the upper convolution 23 of a helical spring preferably formed from metal of square cross section and is accordingly provided with a surface 24 fitting the upper termination of the helix and a notch 25 engaging the end of the upper convolution.

The helical spring shown generally at 26 substantially fits the inner wall of the sleeve 21 and preferably the outer surface thereof is finished by grinding to the surface of a cylinder, the surface being indicated at 27, whereby it may fit the inner wall of the sleeve 21, which is correspondingly accurately finished, as intimately as cylindrical bearing elements.

The upper sleeve 21 terminates as at 28 approximately midway axially of the spring 26. Below the upper sleeve 21 is a lower sleeve 29 which is also finished to fit the cylindrical outer surface 27 of the spring 26.

The lower end of the sleeve 29 has a reduced diameter portion 30 in which is coaxially provided a bore 31 in which is fitted, and keyed as at 32, a head 33.

Upwardly axially above the bore 31, the head 33 is reduced in diameter as at 34 to provide a shaft 34 extending axially upwardly through the spring 26, through a bore 35 in the primary clutch head 18 and into a bore 36 in the upper primary clutch head 11.

The shaft 34 interiorly of the clutch head 18 is provided with a groove 37 outwardly radially from which extends a bore 38 in the clutch head 18, in a threaded outer portion of which is screwed a screw 39, the inner end of which projects into the bore 38 and abuts upon a ball 40 disposed in the groove 37.

By the ball and groove construction described, the shaft 34 and through its head 33, the lower sleeve 29, is supported in the position illustrated, the weight being transferred to the ball 40 from the groove 37 and thence to the wall of the bore 38 in the clutch head 18, the latter being supported upon the bushing 17 as described hereinbefore.

Surrounding the shaft 34 and abutting at one end upon the head 33 is a helical compression spring 41, the opposite end of which is disposed upwardly within the helical spring 26 and abuts upon a washer 42 disposed in the bottom of an axially elongated cup 43 through a perforation 44 in the bottom of which, the shaft 34 extends, the skirt 45 of the cup 43 extending coaxially of the shaft 34 in radially spaced telescopic relation therewith and the convolutions of the spring 41 being disposed within the cup skirt 45 around the shaft 34.

In the preferred construction, the shaft 34 has a keyway 46 cut therein and a tongue 47 on the washer 42 extending inwardly radially therefrom is disposed in the keyway 46; and the washer is provided with one or more axially extending lugs 48 extending axially through a suitable perforation or perforations 49 in the bottom of the cup element 43.

The purpose of the washer construction just described is to ensure that the cup 43 will rotate in unison with the shaft 34 for a purpose to be described.

Upon the lower end of the cup skirt 45, is threaded a nut 50 externally knurled as at 51 whereby it may adjustably be turned on the thread 52 of the cup. The upper axial end of the nut 51 is preferably spherical as at 53 and engages a corresponding spherical surface 54 of a clutch trip device 55 comprising an annular body 56 surrounding the thread 52 of the cup and carrying the spherical surface 54 and, on its upward axial surface provided with a cam projection 57 having a cam surface 58 adapted to be engaged by a corresponding inclined surface 59 on the end of the lowermost convolution 60 of the helical spring 26.

The clutch device 55 also has a pair of outwardly radially extending lugs 60 projecting into axially extending slots 61—61 in the wall of the lower sleeve 29.

The extreme upper end of the shaft 34 in the tubular shaft 9 has a pocket 62 formed therein in which is disposed one end of a compression spring 63, the opposite end provided with a button 64 abutting, in the nature of an end thrust bearing upon a washer 65 retained in the end of the bore 36 by an expanding ring-form annular spring 66 set in an internal groove in the bore 36.

The lower end of the shaft 34 or particularly the lower end of the head 33 thereof, may have formed in the lower end as at 67 a tool receptacle such, for example, as a hexagonal socket into which a hexagonal shank 68 of a nut-driven wrench 69 may be telescoped. To retain the shank 68 removably in the socket 67, the shank may have turned thereon a groove 70; and in a wall of the socket 67 a perforation 71 may be provided and a ball 72 disposed therein, projecting into the groove 70. Thus the shank 68 may be rotatively driven by the head 33 and may be prevented from axial displacement in the socket 67 by the ball 72. To retain the ball in place, a sleeve 73 is provided disposed coaxially with the shank 68 and head 33 and having an inwardly radially projecting bead 74.

The sleeve 73 is constrained axially resiliently by a spring 75 so that the upper end of the sleeve abuts as at 76 upon the lower end of the sleeve 29, the spring 75 abutting at its upper end upon the bead 74 and at its lower end upon a shoulder 78 formed on the head 33. In this construction, the lower end of the head 33 has a reduced, generally cylindrical, portion 79 upon which the bead 74 may move axially telescopically.

Upon moving the sleeve 73 downwardly against the compression tension of the spring 75, the bead 74 will be displaced axially from the ball 72 and the ball may roll outwardly through the perforation 71, whereupon the shank 68 may be removed.

The ball 72 may be prevented from dropping out of the bore 71 inwardly by suitably inwardly constrictingly pressing or otherwise reducing the diameter of the bore 71 at the inward termination thereof as at 80.

The operation of the embodiment of my invention of Figs. 1 and 2 thus far described is as follows.

Normally, the spring 63, exerting a downward end thrust on the shaft 34 communicates this thrust to the clutch head 18 through the ball 40 and thus normally maintains the clutch teeth 12 and 19 out of engagement.

The operator, by means of the switch trigger 4 may start the motor in the housing 1 whereby its rotary movement will be transmitted through the pinion 6 to the gear 7 and rotate the clutch head 11, having thereon the clutch tooth 12.

Assuming that the motor is to drive a nut or bolt-screwing wrench such as 69, the operator presents the wrench 69 to the work, and as shown in Fig. 1 may telescope the wrench over a nut or over a bolt head 85.

Upon pushing axially upon the wrench 69 by means of the handle 2, the shaft 34 will be moved upwardly as viewed in the drawing carrying the clutch head 18 upwardly to engage the tooth or teeth 19 thereof with the tooth or teeth 12 of the clutch head 11 and the torque of the motor will be transmitted to the head 18.

The sleeves 21 and 29 move upwardly with the shaft in substantially the same relative positions as illustrated and rotary movement of the head 18 is communicated to the spring 26 through the notch 25 and rotational movement of the spring around its axis is transmitted from the lower end of the spring 59 to the cam surface 58 and thence into the cam projection 57 and into the clutch device 55 and thence by means of the lugs 60—60 the clutch device 55 rotates the lower sleeve 29 and head 33 and the wrench 69.

When the bolt or nut 85 being turned resists turning movement, the end 59 of the spring will be forced against the cam surface 58 with a substantial amount of force which will cause the spring 26 to tend to unwind, causing it to expand diametrically and to grip the inner wall of the sleeve 29 as well as the inner wall of the sleeve 21.

A relatively small force on the end of the spring 26 will be sufficient to cause the spring to grip the sleeve with a very great torque transmitting frictional engagement. The full power of the motor may now be transmitted through the spring 26 and thence by its frictional engagement with the sleeve 29, through the latter and to the tool 69.

Although the force between the end 59 of the spring and the cam surface 58, is a relatively small force compared with the force transmitted to the sleeve 29, nevertheless it will vary in proportion to the total torque transmitted. Thus if the load transmitted to the wrench 69 rises to a predetermined value such as for example the torque load desired to effectively seat a nut or a bolt head, the force transmitted by the end 59 of the spring will likewise reach a predetermined value at that point. When such force value is reached, the end of the spring 59 acting on the surface 58 as upon a cam, will ride over the cam surface 58 shoving the clutch device 55 as a whole downwardly against the opposing tension of the spring 41. The transmission of torque therefore will immediately cease and at each revolution of the spring 26, the end 59 thereof will trip over the clutch surface 58.

The value at which the clutch thus releases may be adjusted or varied by turning the nut 50 one way or the other to change the tension of the spring 41 in a manner that will now be understood.

Upon turning the nut 50, the cup-shaped element 43 is prevented from turning by its engagement with the lugs 48 on the washer 49 and the engagement of the washer 49 with the keyway 46 in the shaft 34.

Upon releasing axial pressure upon the tool 69, the spring 63 will expand to disengage the clutch head teeth 12 and 19 and even if the motor continues to run, the tool will stop rotating.

When the device releases as above described, the clutch device 55 will vibrate up and down axially as the spring end 59 trips over the clutch projection 57, and the slots 61 permit the lugs 60—60 to reciprocate therein during this movement.

Referring to Fig. 3, I have shown a modification of my invention in which it is applied to transmit, from a driving shaft 100 to a driven shaft 101. The driving shaft 100 rotatably drives a clutch head 102 by means of a feather key 103. By means of a lever 104, an operator may shift the head 102 axially say toward the right, a pin or pins 105 on a suitable fork on the lever 104, entering a circular groove 106 in the head 102 according to well known construction.

Upon so shifting the head 102, a tooth 107 thereon will engage a tooth 108 and rotate the clutch head 109 causing a notch 110 thereof to rotatably drive the helical spring 111. The spring 111 may engage at the end 112 thereof, a clutch tooth 113 on a clutch device 114 resiliently constrained axially. A relatively slight pressure applied through the end 112 of the spring will cause the cylindrical body of the spring to expand and frictionally engage the inner wall 116 of the sleeve 117 with very great driving friction.

Rotation of the sleeve 117 is transmitted to the head 118 which is rigidly connected thereto by bolts 119, and the head being rigidly connected as by bolts 120 to the shaft 101, drives the shaft 101.

It will be observed that the general construction and the operation of the device of Fig. 3 is similar to or the same as that of Figs. 1 and 2 with the exception that the teeth 108 and 107 are initially engaged by manual power through a lever which may be disposed convenient to the hand of an operator at a station or machine to which power is delivered from the shaft 101. In such an instance, the shaft 101 may be adapted to apply power to a machine tool with which the lever 104 is associated.

The device of Fig. 3 may be installed wherever such a machine tool is employed to do work in which an excess load on the machine may suddenly occur either in the normal operation of the machine or accidentally. The device will operate the machine under normal conditions and upon the occurrence of the overload release and the releasing load may be predetermined by adjusting the spring 115.

The foregoing brief description of Fig. 3 is believed sufficient in view of its similarity to Figs. 1 and 2 and the more complete description of the latter hereinbefore.

My invention is not limited to the exact details of construction shown and described. Many changes and modifications may be made other than those illustrated and described and without departing from the spirit of my invention or sacrificing its advantages.

I claim:

1. In a power transmitting clutch mechanism, a rotatable driving element comprising a coiled spring, a rotatable driven element provided with a hollow wall within which the spring is axially disposed, means for radially expanding the spring to cause it to frictionally drivingly engage the wall comprising a cam surface portion of the driven element receiving tangential thrust from a spring convolution and resiliently yieldable axially.

2. In a power transmitting clutch mechanism, a rotatable driving element comprising a coiled spring, a rotatable driven element provided with a hollow wall within which the spring is axially disposed, means for radially expanding the spring to cause it to frictionally drivingly engage the wall comprising a cam surface portion of the driven element receiving tangential thrust from a spring convolution and resiliently yieldable axially, to disengage the spring upon the occurrence of tangential thrust beyond a predetermined value.

3. In a power transmitting clutch mechanism, a rotatable driving element comprising a coiled spring, a rotatable driven element provided with a hollow wall within which the spring is axially disposed, means for radially expanding the spring to cause it to frictionally drivingly engage the wall comprising an inclined cam surface portion of the driven element engaged by an end of the spring and resiliently yieldable axially of the spring to disengage the spring upon the occurrence of engagement force above a predetermined value.

4. In a power transmitting automatically releasable clutch mechanism, a rotatable driving element comprising a helical spring formed to have an external generally cylindrical surface, a rotatable driven element having a hollow cylindrical wall coaxial of the spring wall and substantially fitting the same, an axially resiliently yieldable member of the driven element having an inclined cam face engaging an end convolution of the spring, whereby resistance to rotation of the driven element will cause the tangentially engaging force between the spring end and face to expand the spring radially to cause it to drivingly frictionally engage the cylinder wall and whereby upon rise of driven load of a predetermined value the spring end will move the yieldable member and ride over the cam face to effect cessation of transmission.

5. In a power transmitting automatically releasable clutch mechanism, a rotatable driving element comprising a helical spring formed to have an external generally cylindrical surface, a rotatable driven element having a hollow cylindrical wall coaxial of the spring wall and substantially fitting the same, an axially resiliently yieldable member of the driven element having an inclined cam face engaging an end convolution of the spring, whereby resistance to rotation of the driven element will cause a relatively small tangential engaging force between the spring end and the base to expand the spring radially to cause it to drivingly frictionally engage the cylinder wall with a relatively great driving torque, and whereby upon rise of the driven load to a predetermined value, the spring end will move the yieldable member axially and ride over the cam face to effect cessation of transmission.

6. In a power transmitting automatically releasable clutch mechanism, a rotatable driving element comprising a helical spring formed to have an external generally cylindrical surface, a rotatable driven element having a hollow cylindrical wall coaxial of the spring wall and substantially fitting the same, an axially resiliently yieldable member of the driven element having an inclined cam face engaging an end convolution of the spring, whereby resistance to rotation of the driven element will cause the tangentially engaging force between the spring end and face to expand the spring radially to cause it to drivingly frictionally engage the cylinder wall and whereby upon rise of driven load to a predetermined value the spring end will move the yieldable member and ride over the cam face to effect cessation of transmission and a spring for opposing axial movement of the yieldable member and a means for adjusting the tension of the spring to vary the predetermined value.

7. In a power transmitting clutch mechanism, a rotatable driving element comprising a coiled spring, a rotatable driven element provided with a hollow wall within which the spring is axially disposed, means for radially expanding the spring to cause it to frictionally drivingly engage the wall comprising a cam surface portion of the driven element receiving tangential thrust from a spring convolution and resiliently yieldable axially, driving means for said driving element and mutually engageable and disengageable operable clutch devices associated with the driving means and the driving element.

8. In a power transmitting clutch mechanism, a rotatable driving element comprising a coiled spring, a rotatable driven element provided with a hollow wall within which the spring is axially disposed, means for radially expanding the spring to cause it to frictionally drivingly engage the wall comprising a cam surface portion of the driven element receiving tangential thrust from a spring convolution and resiliently yieldable axially, to disengage the spring upon the occurrence of tangential thrust upon a predetermined value, driving means for said driving element and mutually engageable and disengageable operable clutch devices associated with the driving means and the driving element.

9. In a power transmitting clutch mechanism, a rotatable driving element comprising a coiled spring, a rotatable driven element provided with a hollow wall within which the spring is axially disposed, means for radially expanding the spring to cause it to frictionally drivingly engage the wall comprising an inclined cam surface portion of the driven element engaged by an end of the spring and resiliently yieldable axially of the spring to disengage the spring upon the occurrence of engagement force above a predetermined value, driving means for said driving element and mutually engageable and disengageable operable clutch devices associated with the driving means and the driving element.

10. In a power transmitting automatically releasable clutch mechanism, a rotatable driving element comprising a helical spring formed to have an external generally cylindrical surface, a rotatable driven element having a hollow cylindrical wall coaxial of the spring wall and substantially fitting the same, an axially resiliently yieldable member of the driven element having an inclined cam face engaging an end convolution of the spring, whereby resistance to rotation of the driven element will cause the tangentially engaging force between the spring end and face to expand the spring radially to cause it to drivingly frictionally engage the cylinder wall and whereby upon rise of driven load to a predetermined value the spring end will move the yieldable member and ride over the cam face to effect cessation of transmission, driving means for said driving element and mutually engageable and disengageable operable clutch devices associated with the driving means and the driving element.

11. In a power transmitting automatically releasable clutch mechanism, a rotatable driving element comprising a helical spring formed to have an external generally cylindrical surface, a rotatable driven element having a hollow cylindrical wall coaxial of the spring wall and substantially fitting the same, an axially resiliently yieldable member of the driven element having an inclined cam face engaging an end convolution of the spring, whereby resistance to rotation of the driven element will cause a relatively small tangential engaging force between the spring end and the face to expand the spring radially to cause it to drivingly frictionally engage the cylinder wall with a relatively great driving torque, and whereby upon rise of the driven load to a predetermined value, the spring end will move the yieldable member axially and ride over the cam face to effect cessation of transmission, driving means for said driving element and mutually engageable and disengageable operable clutch devices associated with the driving means and the driving element.

12. In a power transmitting automatically releasable clutch mechanism, a rotatable driving element comprising a helical spring formed to have an external generally cylindrical surface, a rotatable driven element having a hollow cylindrical wall coaxial of the spring wall and substantially fitting the same, an axially resiliently yieldable member of the driven element having an inclined cam face engaging an end convolution of the spring, whereby resistance to rotation of the driven element will cause the tangentially engaging force between the spring end and face to expand the spring radially to cause it to drivingly frictionally engage the cylinder wall and whereby upon rise of driven load to a predetermined value the spring end will move the yieldable member and ride over the cam face to effect cessation of transmission and a spring for opposing axial movement of the yieldable member and a means for adjusting the tension of the spring to vary the predetermined value, driving means for said driving element and mutually engageable and disengageable operable clutch devices associated with the driving means and the driving element.

13. In a power transmitting clutch mechanism, a rotatable driving element comprising a coiled spring having an abutment on a convolution thereof, a hollow rotatable load torque applying driven element having an inner wall within which the spring is axially disposed, means for radially expanding the spring to cause it to frictionally drivingly engage the wall when rotation of the driven element is resisted by load, comprising an auxiliary element rotatable with the driven element and having a connection therewith preventing rotational movement relative thereto but permitting axial movement relative thereto and having an inclined cam surface disposed to receive tangential thrust from the convolution abutment, and means yieldingly holding the auxiliary element against axial movement to maintain yielding engagement of the abutment and cam surface.

14. In a power transmitting clutch mechanism, a rotatable driving element comprising a coiled spring having an abutment on a convolution thereof, a hollow rotatable load torque applying driven element having an inner wall within which the spring is axially disposed, means for radially expanding the spring to cause it to frictionally drivingly engage the wall when rotation of the driven element is resisted by load, comprising an auxiliary element rotatable with the driven element and having a connection therewith preventing rotational movement relative thereto but permitting axial movement relative thereto and having an inclined cam surface disposed to receive tangential thrust from the convolution abutment, and means yieldingly holding the auxiliary element against axial movement to maintain yielding engagement of the abutment and cam surface at all torque loads below a predetermined load only.

15. In a power transmitting automatically releasable clutch mechanism, a rotatable driving element comprising a helical spring formed to have an external generally cylindrical surface, a torque applying rotatable driven element having an internal cylindrical wall coaxial of the spring surface and substantially fitting the same, the driven member comprising an auxiliary element connected thereto by connecting means preventing relative rotation but permitting axial movement relative thereto, and provided with an inclined cam face engaging an end convolution of the spring, resilient means yieldingly opposing axial movement of the said auxiliary element yieldingly maintaining engagement of the spring and cam face to cause the tangential engaging force between the spring end and face effected by load resistance to rotation of the driven element, to expand the spring radially into driving friction engagement with the cylindrical wall and to cause the spring end to move the auxiliary element axially and to ride over the cam face to effect cessation of transmission upon attainment of driven load to a predetermined maximum value.

16. In a power transmitting automatically releasable clutch mechanism, a rotatable driving element comprising a helical spring formed to have an external generally cylindrical surface, a torque applying rotatable driven element having an internal cylindrical wall coaxial of the spring surface and substantially fitting the same, the driven member comprising an auxiliary element connected thereto by connecting means preventing relative rotation but permitting axial movement relative thereto, and provided with an inclined cam face engaging an end convolution of the spring, a spring yieldingly opposing axial movement of the said auxiliary element yieldingly maintaining engagement of the spring and cam face to cause the tangential engaging force between the spring end and face effected by load resistance to rotation of the driven element, to expand the spring radially into driving friction engagement with the cylindrical wall and to cause the spring end to move the auxiliary element axially and to ride over the cam face to effect cessation of transmission upon attainment of driven load to a predetermined maximum value, and means for adjusting the tension of the second mentioned spring to adjustably vary the said predetermined maximum load.

17. In a power transmitting automatically releasable clutch mechanism, a main frame, a source of power and a rotary power driven clutch device supported on the frame, a drivable member rotatably and axially movably supported on the frame and having clutch means engageable with and disengageable from the clutch device by relative axial movement of the clutch device and the clutch means, a helical spring formed to have an external generally cylindrical surface, the drivable member having an inner cylindrical wall coaxial of the spring cylindrical surface and substantially fitting a portion of the same, and one end convolution of the helical spring engaged with the drivable member whereby upon rotation of the drivable member it may rotate the helical spring about its axis, a second member having an inner cylindrical wall substantially fitting another portion of the spring cylindrical surface the second member being rotatably supported upon the first member in substantially fixed axial relation thereto whereby when the clutch device and the clutch means are engaged, the drivable member may be rotated and through the helical spring may rotate the second member, an auxiliary element having a connection with the second member preventing relative rotation but permitting axial movement relative thereto and having an inclined cam face engaging the other end convolution of the helical spring, a second spring resiliently yieldably constraining the auxiliary element against axial movement in the direction to disengage the face and spring end, the face and second spring tension being proportioned so that load resistance to rotation of the second member may cause the engaging force of the said helical spring other end and said face to expand the helical spring radially to cause it to drivingly frictionally engage the cylindrical walls of the said members and so that upon rise of driven load resistance to a predetermined maximum value the spring end will move the said auxiliary element axially and ride over the cam face to effect cessation of power transmission, and means for adjusting the tension of the second spring to vary the said predetermined value.

18. A power transmitting mechanism as described in claim 17 and in which the auxiliary element is provided with means extending therefrom into the helical spring provided with a spring connectible portion disposed relatively remotely from the auxiliary element and the said second spring engages the spring connectible portion by one end and at its other end engages a portion of the second member.

19. In a power transmitting automatically releasable clutch mechanism, a rotatable driving element comprising a helical spring formed to have an external generally cylindrical surface, a rotatable driven element having an internal cylindrical wall coaxially of the spring surface and substantially fitting the same, the driven element comprising an auxiliary element having a spline connection with the driven element and provided with an inclined cam face engaging a convolution of the spring, a second spring yieldingly opposing axial movement of the auxiliary element, the spring tension and cam face being proportioned so that resistance to rotation of the driven element will cause the engaging force between the helical spring convolution and cam face to expand the helical spring radially to cause it to drivingly frictionally engage the cylindrical wall and so that upon rise of driven load to a predetermined value, the helical spring will move the movable element and ride over the cam face to effect cessation of transmission.

20. In a power transmitting automatically releasable clutch mechanism, a rotatable driving element comprising a helical spring formed to have an external generally cylindrical surface, a rotatable driven element having an internal cylindrical wall coaxial of the spring surface and substantially fitting the same, the driven element comprising an auxiliary element having a connection with the driven element permitting relative axial movement but preventing relative rotational movement therewith, and provided with an inclined cam face engaging a convolution of the spring, a second spring yieldingly opposing axial movement of the auxiliary element, the spring tension and cam face being proportioned so that resistance to rotation of the driven element will cause the engaging force between the helical spring convolution and cam face to expand the helical spring radially to cause it to drivingly frictionally engage the cylindrical wall and so that upon rise of driven load to a predetermined value, the helical spring will move the movable element and ride over the cam face to effect cessation of transmission.

21. In a power transmitting automatically releasable clutch mechanism, a rotatable driving element comprising a helical spring formed to have an external generally cylindrical surface, a rotatable driven element having an internal cylindrical wall coaxial of the spring surface and substantially fitting the same, the driven element comprising an auxiliary element having connection with the driven element permitting relative axial movement but preventing relative rotational movement therewith, and provided with an inclined cam face engaging a convolution of the spring, an extension on the auxiliary movable element projecting into the helical spring and provided with a spring engageable portion relatively remotely disposed from the auxiliary element, a second spring yieldingly opposing axial movement of the auxiliary element and engaging the spring engageable portion of the extension at one of its ends and at its other end engaging portion of the driven element, the spring tension and cam face being proportioned so that resistance to rotation of the driven element will cause the engaging force between the helical spring convolution and cam face to expand the helical spring radially to cause it to drivingly frictionally engage the cylindrical wall so that upon rise of driven load to a predetermined value, the helical spring will move the movable element and ride over the cam face to effect cessation of transmission.

22. In a power transmitting automatically releasable clutch mechanism, a rotatable driving element comprising a helical spring formed to have an external generally cylindrical surface, a rotatable driven element having an internal cylindrical wall coaxial of the spring surface and substantially fitting the same, the driven element comprising an auxiliary element having a connection with the driven element permitting relative axial movement but preventing relative rotational movement therewith, and provided with an inclined face engaging a convolution of the spring, a second spring yieldingly opposing axial movement of the auxiliary element, the spring tension and cam face being proportioned so that resistance to rotation of the driven element will cause the engaging force between the helical spring convolution and cam face to expand the helical spring radially to cause it to drivingly frictionally engage a cylindrical wall so that upon rise of driven load to a predetermined value, the helical spring will move the movable element and ride over the cam face to effect cessation of transmission, and means for adjusting the tension of the second spring to vary the said predetermined value.

23. In a power transmitting automatically releasable clutch mechanism, a rotatable driving element comprising a helical spring formed to have an external generally cylindrical surface, a rotatable driven element having an internal cylindrical wall coaxial of the spring surface and substantially fitting the same, the driven element comprising an auxiliary element having a connection with the driven element permitting relative axial movement but preventing relative rotational movement therewith and provided with an inclined cam face engaging a convolution of the spring, a second spring yieldingly opposing axial movement of the auxiliary element, an extension on the auxiliary element projecting into the helical spring and screw-threadedly adjustable relative to the auxiliary element provided with a spring-engageable portion, the spring tension and cam face being proportioned so that resistance to rotation of the driven element will cause the engaging force between the helical spring convolution and cam face to expand the helical spring radially to cause it to drivingly frictionally engage the cylindrical wall so that upon rise of the driven load to a predetermined value, the helical spring will move the movable element and ride over the cam face to effect cessation of transmission, the said second spring being connected at one end to the spring-engageable portion of the extension and at its other end to a portion of the driven element, and the tension of the second spring being adjustably variable to vary the predetermined value by adjusting the screw thread connections.

EDWIN L. CONNELL.